US012151359B2

(12) United States Patent
Hsieh

(10) Patent No.: US 12,151,359 B2
(45) Date of Patent: Nov. 26, 2024

(54) SLIDER LIMIT TOOL PLACEMENT PLATE

(71) Applicant: Chih-Chien Hsieh, Taichung (TW)

(72) Inventor: Chih-Chien Hsieh, Taichung (TW)

( * ) Notice: Subject to any disclaimer, the term of this patent is extended or adjusted under 35 U.S.C. 154(b) by 0 days.

(21) Appl. No.: 18/302,202

(22) Filed: Apr. 18, 2023

(65) Prior Publication Data

US 2024/0351186 A1 Oct. 24, 2024

(51) Int. Cl.
*B25H 3/06* (2006.01)
*B25H 3/00* (2006.01)

(52) U.S. Cl.
CPC ............... *B25H 3/06* (2013.01); *B25H 3/003* (2013.01)

(58) Field of Classification Search
CPC . B25H 3/06; B25H 3/003; B25H 3/00; B25H 3/02; B25H 3/04
See application file for complete search history.

(56) References Cited

U.S. PATENT DOCUMENTS

| | | | | | |
|---|---|---|---|---|---|
| D725,993 | S * | 4/2015 | Ernst | D8/343 | |
| 9,364,949 | B2 * | 6/2016 | Ernst | B25H 3/06 | |
| D774,765 | S * | 12/2016 | Hsieh | D3/313 | |
| D785,429 | S * | 5/2017 | Hsieh | D8/71 | |
| D787,185 | S * | 5/2017 | Hsieh | D3/313 | |
| D813,636 | S * | 3/2018 | Hsieh | D8/71 | |
| 10,603,785 | B1 * | 3/2020 | Hsieh | B25H 3/003 | |
| D952,434 | S * | 5/2022 | Hsieh | D8/71 | |
| 11,453,113 | B1 * | 9/2022 | Hsieh | B25H 3/06 | |
| 11,667,029 | B1 * | 6/2023 | Hsieh | B25H 3/04 | 206/372 |
| 2003/0234196 | A1 * | 12/2003 | Hu | B25H 3/04 | 206/372 |
| 2016/0271788 | A1 * | 9/2016 | Hsieh | B25H 3/04 | |
| 2020/0406447 | A1 * | 12/2020 | Hsieh | B25H 3/04 | |
| 2021/0146525 | A1 * | 5/2021 | Spaulding, Jr. | B25H 3/02 | |

FOREIGN PATENT DOCUMENTS

| | | | |
|---|---|---|---|
| EP | 0379620 | A1 * | 8/1990 |
| JP | 3233607 | U * | 8/2021 |

* cited by examiner

*Primary Examiner* — Jacob K Ackun
(74) *Attorney, Agent, or Firm* — Egbert, McDaniel & Swartz, PLLC

(57) ABSTRACT

A slider limit tool placement plate, wherein the plate is provided with a slider to limit the tool strip in the Z-axis, the sliding piece includes a pressing plate part, two compression edge parts, an abutting edge and an inner side, wherein the pressing plate part is used to align the second end section of the tool strip and has the Z-axis limiting effect, and the compression edge part is embedded in the second end buckle part in a sliding manner along the X-axis. An anti disengaging stopper is formed at the bottom of the plate adjacent to the edge of the second end. The anti disengaging stopper includes a release control part and a clamping part with elastic swing reset characteristics, wherein the clamping part and the height of the slider inside in the Z-axis present a relative alignment relationship, and the release control part is used to release the abutting state of the clamping part.

9 Claims, 6 Drawing Sheets

SLIDER LIMIT TOOL PLACEMENT PLATE

CROSS-REFERENCE TO RELATED U.S. APPLICATIONS

Not applicable.

BACKGROUND OF THE INVENTION

1. Field of the Invention

The present invention relates generally to a tool strip placement plate, and more particularly to an innovative tool placement structure type which achieves a tool strip positioning function by slider limit.

2. Description of Related Art Including Information Disclosed Under 37 CFR 1.97 and 37 CFR 1.98

In terms of the tool strip placement plate of the present invention, the tool strip refers to a product type with a tool placement function. Multiple tools (e.g. sleeves) of different specifications are assembled on a strip holder structure, and then the strip holder is fixed to a placement plate structure.

In the known tool strip placement plate structure type design, as disclosed by the patent for invention U.S. Pat. No. 9,364,949B2 “slide rail and tray for box spanner”, the tool strip is localized usually by crosswise slide assembly method. It is inserted in the preset transverse groove of placement box, so as to achieve a certain limit positioning effect. However, this known structure type still has some problems and defects in practical application, for example, the placement plate must form a transverse groove with adequate embedding travel, so the length and volume of the placement box corresponding to the length specification of tool strip end must be augmented to some extent, so as to meet the localization requirement, but the material cost of placement box certainly will increase sharply; in terms of localization steadiness, in the condition of loading tools (e.g. sleeves), as the tool strip is localized by crosswise slide assembly method, when it confronts an opposite acting force, it may easily withdraw to get in the release condition. Therefore, during the product drop test in the circle, the tool strip is sometimes disassembled and dropped off spontaneously due to the instantaneous impact and vibration when the placement box falls to the ground, it is difficult to pass the test, there are potential safety risks in its application.

BRIEF SUMMARY OF THE INVENTION

The primary object of the present invention is to provide a slider limit tool placement plate, the technical problem to be solved is to make innovation and breakthrough in how to develop a novel tool strip placement structure type with more ideal practicability.

Based on said purpose, the technical characteristic of problem solving of the present invention is that the slider limit tool placement plate comprises:

- a plate, comprising a plate bottom, a first end edge, a second end edge and two lateral sides, wherein the first end edge and the second end edge are apart from each other, an X axis and a Y axis are defined according to the horizontal extension direction of the first end edge and the second end edge as well as a Z-axis in vertical direction;
- a plurality of first end gripping edge part, formed nearby the first end edge of the plate;
- two second end buckle parts, formed pairwise on both sides of the second end edge of the plate;
- a plurality of tool strip, the tool strip is strip-like and formed with a first end section and a second end section, and there are a plurality of tool positioning elements between the first end section and the second end section, the first end section is assembled towards the first end edge of the plate, and the first end section is inserted in the first end gripping edge part, the first end gripping edge part and the second end edge form a limiting effect on the tool strip on the X-axis, the second end section is assembled towards the second end edge of the plate, and the second end buckle part and the second end section are aligned with each other on the X-axis;
- a slider for limiting the tool strip on the Z-axis, the slider comprises a pressing plate part, two compression edge parts, an abutting edge and an inner side, the pressing plate part is used for aligning the second end section of the tool strip to achieve a Z-axis limiting effect, the two compression edge parts are formed at both ends of the pressing plate part, and the two compression edge parts are embedded in the two second end buckle parts in a sliding manner along the X-axis, so as to form a Z-axis positioning state of the slider; and
- an anti-disengaging stopper, formed on the plate bottom of the plate adjacent to the second end edge, the anti-disengaging stopper comprises a release control part and a clamping part with elastic swing reset characteristics, the clamping part and the height of the inner side of the slider on the Z-axis present a relative alignment relationship, the release control part is used for releasing the abutting state of said clamping part.

Wherein said second end buckle part can be formed pairwise in two positions on the edge of the second end of the plate, including a plurality of trip parts and a plurality of gripper edges formed on the pressing plate part, the plurality of gripper edges are embedded in the plurality of trip parts in a sliding manner along the X-axis, so as to form a Z-axis positioning state of the slider.

In terms of the effect and advantage of the present invention, with the structure type and technical characteristics of the slider limit tool strip and an anti-disengaging stopper for switching the slider positioning state, the plate can optimize the tool strip positioning effect in the condition of the shortest X-axis length, so as to guarantee better tool placement steadiness and better economic benefit of lower material cost of tool strip placement plate products.

DETAILED DESCRIPTION OF THE INVENTION

FIG. 1 to FIG. 9 show the preferred embodiments of the slider limit tool placement plate of the present invention, but these embodiments are for illustration only, the patent application is not limited to this structure.

Figure 1:
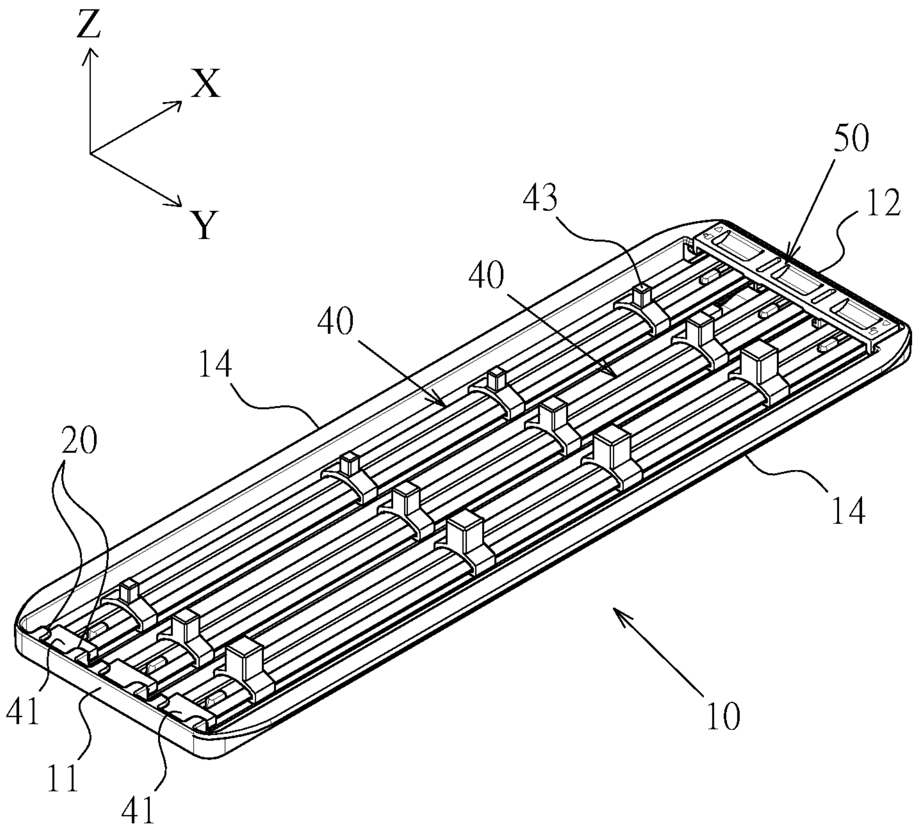
FIG. 1 is the integral combination stereogram of the preferred embodiment of the present invention.

Said slider limit tool placement plate comprises a plate 10, including a plate bottom 13, a first end edge 11, a second end edge 12 and two lateral sides 14, wherein the first end edge 11 and the second end edge 12 are apart from each other. An X axis and a Y axis are defined according to the horizontal extension direction of the first end edge 11 and the second end edge 12, as well as a Z-axis in vertical direction (FIG. 1). More than one first end gripping edge part 20 are formed nearby the first end edge 11 of the plate 10. Two second end buckle parts 30 are formed pairwise on both sides of the second end edge 12 of the plate 10. More than one tool strip 40 are provided. The tool strip 40 is strip-like and formed with a first end section 41 and a second end section 42, and there are a plurality of tool positioning elements 43 between the first end section 41 and the second end section 42, wherein the first end section 41 is assembled towards the first end edge 11 of the plate 10, and the first end section 41 is inserted in the first end gripping edge part 20. The first end gripping edge part 20 and the second end edge 12 form a limiting effect on the tool strip 40 on the X-axis. The second end section 42 is assembled towards the second end edge 12 of the plate 10, and the second end buckle part 30 and the second end section 42 are in a mutual alignment relationship on the X-axis. A slider 50 for limiting the tool strip 40 on the Z-axis comprises a pressing plate part 51, two compression edge parts 52, an abutting edge 53 and an inner side 54, wherein the pressing plate part 51 is used for aligning the second end section 42 of the tool strip 40 to achieve a Z-axis limiting effect, the two compression edge parts 52 are formed at both ends of the pressing plate part 51, and the two compression edge parts 52 are embedded in the two second end buckle parts 30 in a sliding manner along the X-axis, so as to form a Z-axis positioning state of the slider 50. An anti-disengaging stopper 60 is formed on the plate bottom 13 of the plate 10 adjacent to the second end edge 12. The anti-disengaging stopper 60 comprises a release control part 61 and a clamping part with elastic swing reset characteristics 62, wherein the clamping part 62 and the height of the inner side 54 of the slider 50 on the Z-axis present a relative alignment relationship, the release control part 61 is used for releasing the abutting state of said clamping part 62.

Figure 2:
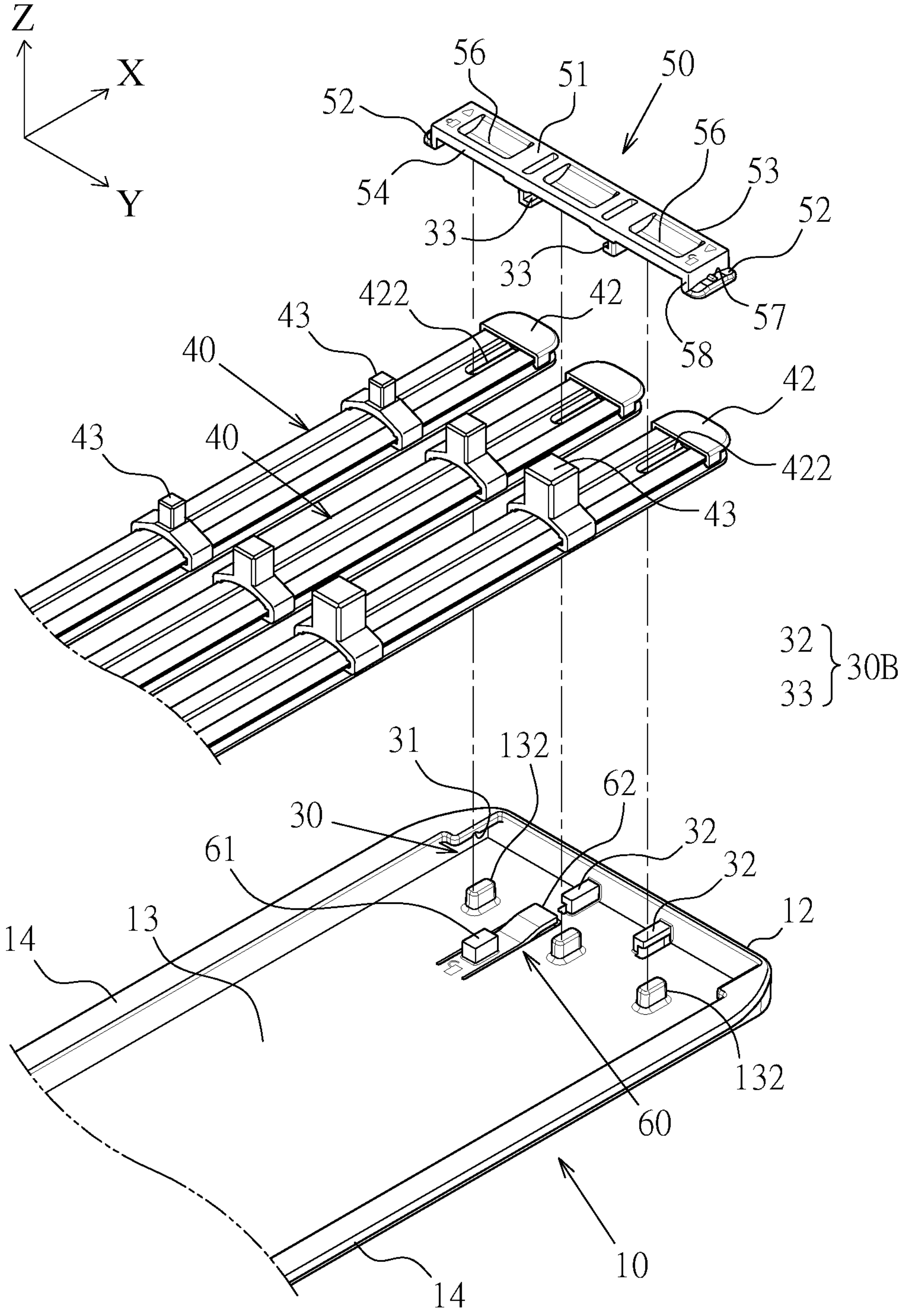
FIG. 2 is the exploded view I of local components in the preferred embodiment of the present invention.
Figure 5:
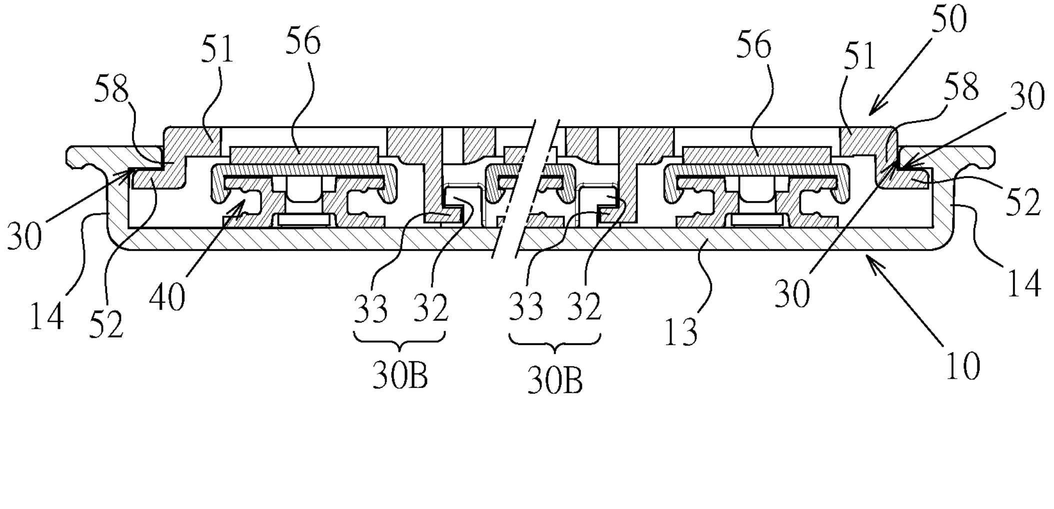
FIG. 5 is the 5-5 sectional view of FIG. 4.

As shown in FIG. 2 and FIG. 5, said second end buckle part 30B can be formed pairwise in two positions on the second end edge 12 of the plate 10, including a plurality of trips 32 and a plurality of gripper edges 33 formed on the pressing plate part 51, so that the plurality of gripper edges 33 are embedded in the plurality of trips 32 in a sliding manner along the X-axis, a Z-axis positioning state of the slider 50 is formed. This case provides another preferred embodiment of said second end buckle part 30B, but considering concise figures, said two second end buckle parts 30, 30B are arranged in parallel, meaning the implementation patterns of said two second end buckle parts 30, 30B can used alternatively or together, there is no limitation.

Figure 6:
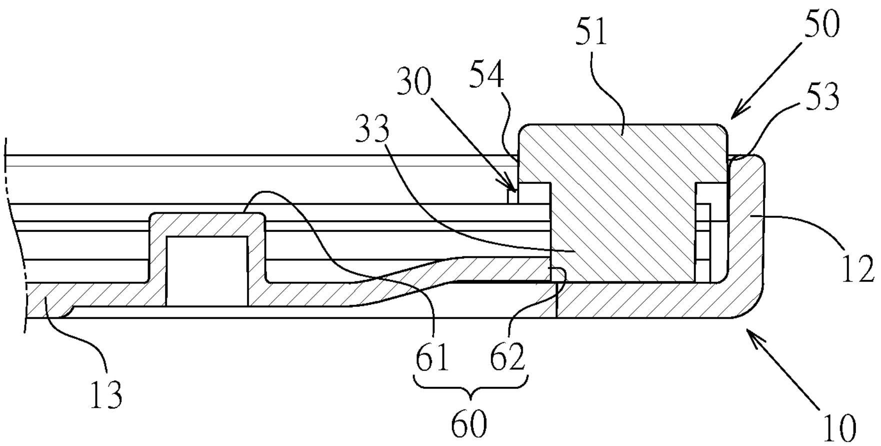
FIG. 6 is the 6-6 sectional view of FIG. 4.

Additionally, the abutting position of the clamping part 62 of the anti-disengaging stopper 60 varies with the implementation patterns of said two second end buckle parts 30, 30B, in terms of the embodiment of trip part 32 and gripper edge 33. The abutting position of the clamping part 62 is on the same side of the gripper edge 33 of inner side 54 of the slider 50 (as shown in FIG. 2 and FIG. 6). If the second end buckle part 30 is only arranged pairwise on both sides of the second end edge 12 of the plate 10, the abutting position of the clamping part 62 of the anti-disengaging stopper 60 is on the inner side 54 of the slider 50.

Figure 8:
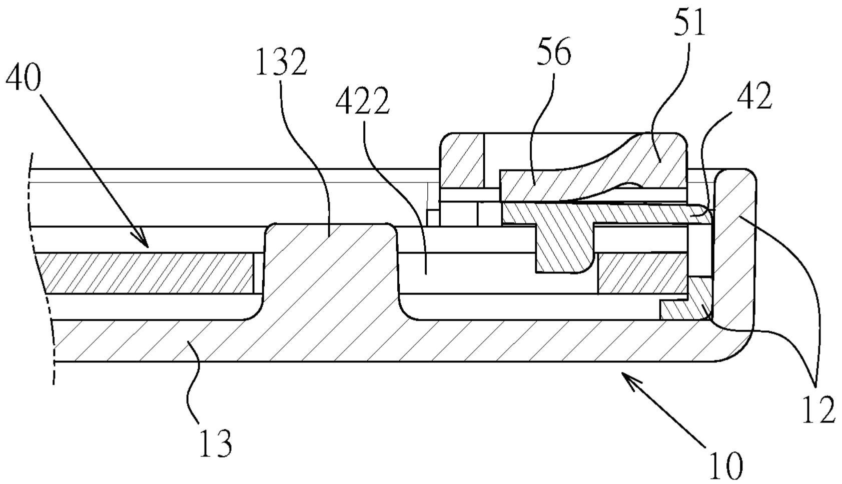
FIG. 8 is the 8-8 sectional view of FIG. 4.

As shown in FIG. 2 and FIG. 8, in this case, the pressing plate part 51 of the slider 50 is formed with more than one elastic sheet 56 to elastically press the aligned second end section 42 of the tool strip 40, so as to form a Z-axis elastic compression effect, the compression positioning effect on the tool strip 40 is further enhanced.

Figure 7:
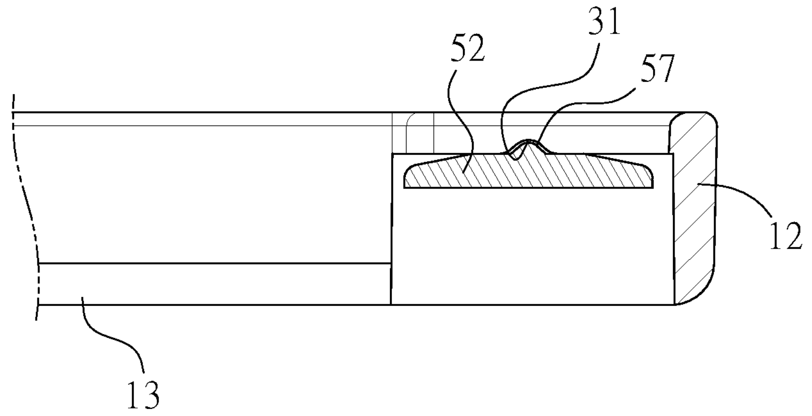
FIG. 7 is the 7-7 sectional view of FIG. 4.

As shown in FIG. 2 and FIG. 7, in this case, the second end buckle part 30 is formed with a positioning recess 31, so that the compression edge part 52 of the slider 50 is formed with a positioning bulge 57. In this case, as the positioning bulge 57 engages with the positioning recess 31, the operator has a hand feeling of in-gear localization when the slider 50 laterally slides in position.

As shown in FIG. 2 and FIG. 5, in this case, the compression edge part 52 and the pressing plate part 51 are connected by a Z-axis connection wall 58, and the Z-axis connection wall 58 and the second end buckle part 30 abut on each other on the Y-axis. This case discloses a specific implementation pattern that the pressing plate part 51 and second end buckle part 30 abut on each other on the Y-axis to achieve steady localization. Alternatively, the compression edge part 52 of the slider 50 and the second end buckle part 30 of the plate 10 abut on each other directly on the Y-axis (note: figures of this case are omitted), to be more specific, the Z-axis section of the slider 50 can be set as a plate-like pattern.

Figure 4:
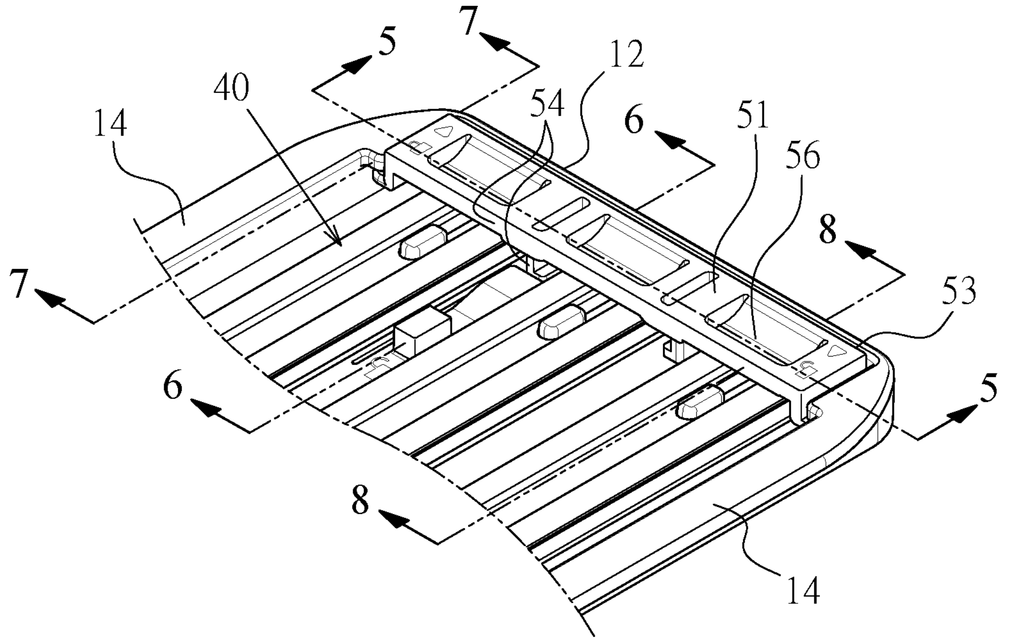
FIG. 4 is the combined stereogram of local components in the preferred embodiment of the present invention.

As shown in FIG. 4 and FIG. 6, in this case, the abutting edge 53 of the slider 50 abuts on the second end edge 12 of the plate 10.

Figure 3:
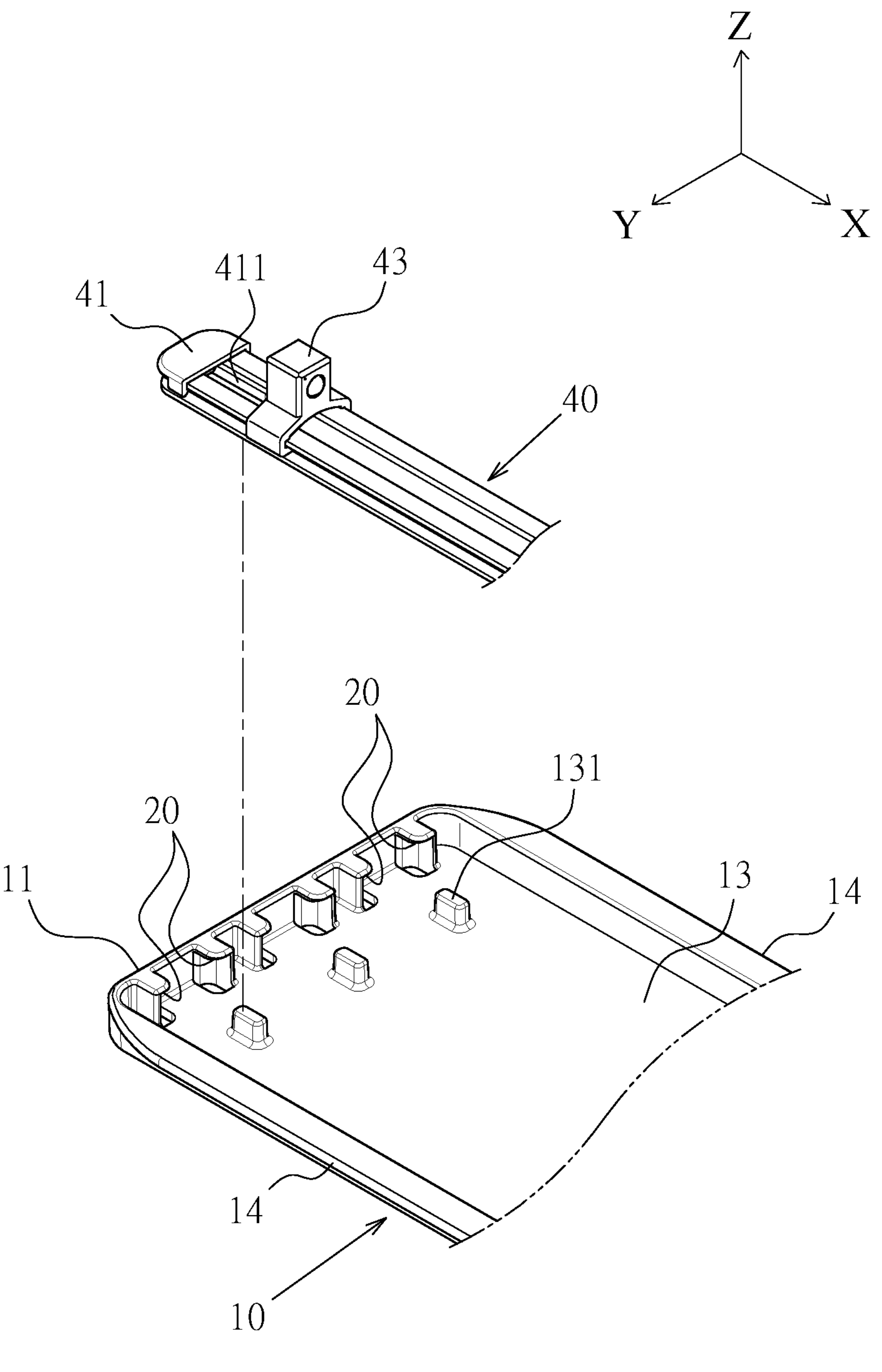
FIG. 3 is the exploded view II of local components in the preferred embodiment of the present invention.

As shown in FIG. 3, in this case, the first end gripping edge part 20 is formed on the first end edge 11 of the plate 10, and the first end section 41 of the tool strip 40 can be inserted in the first end gripping edge part 20 to further achieve a Y-axis positioning state.

As shown in FIG. 3, in this case, the plate bottom 13 of the plate 10 is formed with a first limiting stud 131 corresponding to the first end section 41 of the tool strip 40, so that the first end section 41 is provided with a first limiting edge part 411 (note: not limited to hole, slot or concave edge). As shown in FIG. 2, the plate bottom 13 of the plate 10 is formed with a second limiting stud 132 corresponding to the second end section 42 of the tool strip 40, so that the second end section 42 is provided with a second limiting edge part 422. The X and Y axes of tool strip 40 are localized by the assembly positioning implementation pattern disclosed in this case.

Figure 9:
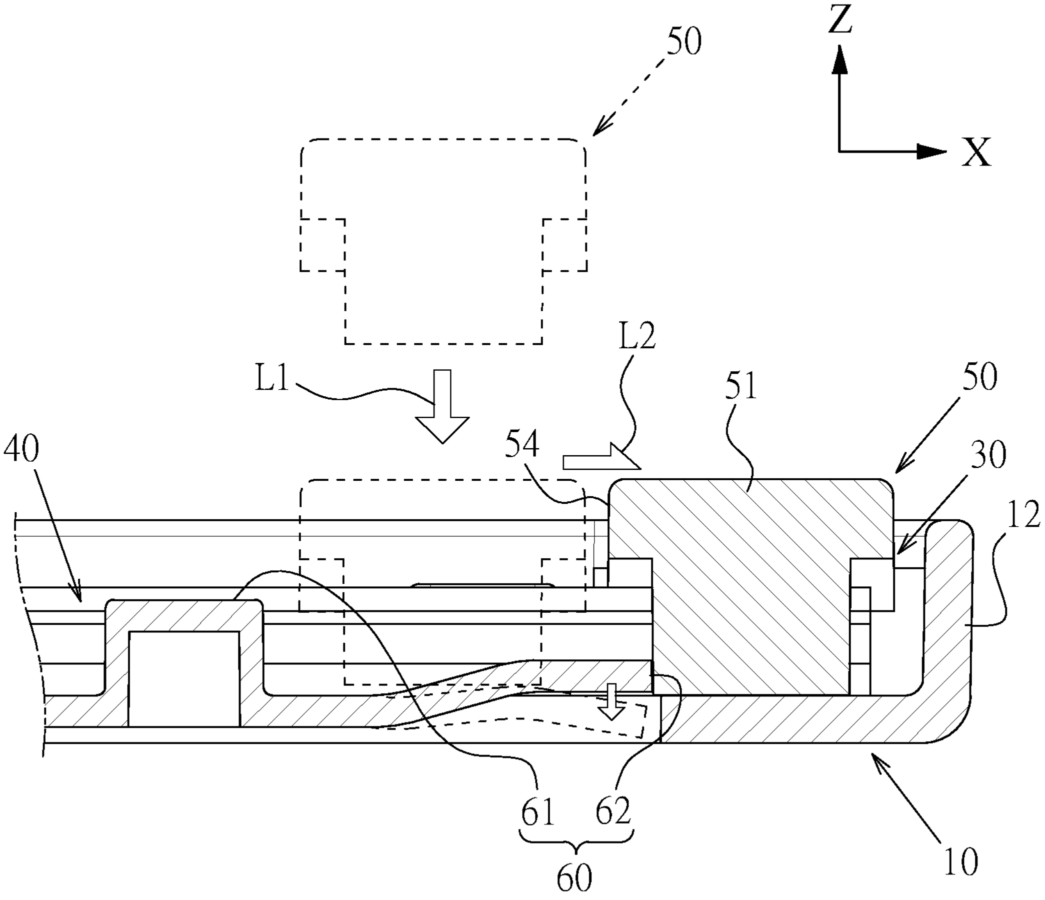
FIG. 9 is the schematic diagram of slider assembly path variation in the preferred embodiment of the present invention.

Based on said structural composition type and technical characteristics, the fixing of tool strip 40 in practical application of the slider limit tool placement plate disclosed in the present invention is described below, as shown in FIG. 3, the first end section 41 of the tool strip 40 is inserted in the first end gripping edge part 20 of the first end edge 11 of plate 10, as shown in FIG. 2, the second end section 42 of tool strip 40 is aligned and assembled on the second end edge 12 of plate 10 along the Z-axis. Then the slider 50 is assembled, as shown in FIG. 9, the slider 50 is inserted towards the dislocation of the second end buckle part 30 along the Z-axis (Arrow L1), the clamping part 62 of the anti-disengaging stopper 60 is elastically pressed down, and the slider 50 is displaced along the X-axis (Arrow L2), till the two compression edge parts 52 are embedded in two second end buckle parts 30 (as shown in FIG. 5), the pressing plate part 51 is aligned with the second end section 42 of tool strip 40 to form a Z-axis limiting effect, the clamping part 62 of the anti-disengaging stopper 60 upsprings to abut on the inner side 54 of slider 50 (as shown in FIG. 6), so that the assembly of slider 50 reaches a steady anti-disengagement state. On the contrary, when the user wants to release the slider 50 and presses the release control part 61 of the anti-disengaging stopper 60, the abutting state of said clamping part 62 is released relatively. Based on the structure type and technical characteristics of the present invention that the slider 50 limits the tool strip 40 and the anti-disengaging stopper 60 switches the positioning state of slider 50, the plate 10 can optimize the tool strip fixing effect in the condition of the shortest X-axis length, so as to guarantee better tool placement fixing state and better economic benefit of lower material cost of tool strip placement plate products.

I claim:

1. A slider limit tool placement plate comprising:

a plate having a plate bottom and a first end edge and a second end edge and a pair of lateral sides, wherein the first end edge and the second end edge are spaced from each other, a horizontal extension direction of the first end edge and the second end edge defining an X-axis and a Y-axis, a vertical direction of the first end edge and the second end edge defining a Z-axis;

a plurality of first end gripping edge parts formed adjacent the first end edge of said plate;

a plurality of second end buckle parts formed respectively on opposite sides of the second end edge of said plate;

a plurality of tool strips in which each tool strip of said plurality of tool strips has a strip shape and is formed with a first end section and a second end section;

a plurality of tool positioning elements formed between the first end section and the second end section, the first end section being assembled toward the first end edge of said plate, the first end section being inserted in one of said plurality of first end gripping edge parts, wherein the one of the plurality of first end gripping edge parts and the second end edge define a limit on one of said plurality of tool strips on the X-axis, the second end section being assembled toward the second end edge of said plate, one of the plurality of second end buckle parts and the second end section being aligned with each other on the X-axis;

a slider that limits a movement of the one of said plurality of tool strips on the Z-axis, said slider having a pressing plate part and a pair of compression edge parts and an abutting edge and an inner side, the pressing plate part aligning the second end section of the one of the plurality of tool strips so as to limit a movement of the one of the plurality of tool strips on the Z-axis, the pair of compression edge parts being formed respectively at opposite ends of the pressing plate part, the pair of compression edge parts being embedded respectively in the plurality of second end buckle parts in a sliding manner along the X-axis so as to define a Z-axis positioning state for said slider; and an anti-disengaging stopper formed on the plate bottom of the plate adjacent to the second end edge, said anti-disengaging stopper having a release control part and a clamping part, the clamping part and a height of an inner side of the slider on the Z-axis being in an aligned relationship, the release control part being adapted to release the clamping part from abutment, wherein one of the pair of compression edge parts is adapted to be movably positioned beneath and abut an underside of one of said plurality of second end buckle parts, such that said slider is slidable in and out along the X-axis direction, the anti-disengaging stopper being set on a path of the sliding in and out of said slider.

2. The slider tool placement plate of claim 1, wherein each of said plurality of second end buckle parts has a positioning recess, each of said pair of compression edge parts of said slider having a positioning bulge.

3. The slider tool placement plate of claim 1, wherein the pair of compression edge parts of said slider and the pressing plate part are connected by a Z-axis connection wall.

4. The slider tool placement plate of claim 1, wherein the pair of compression edge parts of said slider and the plurality of second end buckle parts of the plate directly abut each other on the Y-axis.

5. The slider tool placement plate of claim 1, the abutting edge of said slider abuts the second end edge of said plate.

6. The slider tool placement plate of claim 1, wherein one of the plurality of first end gripping edge parts is formed on the first end edge of said plate, the first end section of the one of said plurality of tool strips being insertable in the one of the plurality of first end gripping edge parts so as to be positionable on the Y-axis.

7. A slider limit tool placement plate comprising:

a plate having a plate bottom and a first end edge and a second end edge and a pair of lateral sides, wherein the first end edge and the second end edge are spaced from each other, a horizontal extension direction of the first end edge and the second end edge defining an X-axis and a Y-axis, a vertical direction of the first end edge and the second end edge defining a Z-axis;

a plurality of first end gripping edge parts formed adjacent the first end edge of said plate;

a pair of second end buckle parts formed pairwise in two positions on the second end edge of said plate, said pair of second end buckle parts having a plurality of trip parts;

a plurality of tool strips in which each tool strip of said plurality of tool strips has a strip shape and formed with a first end section and a second end section;

a plurality of tool positioning elements formed between the first end section and the second end section, the first end section being assembled toward the first end edge of said plate, the first end section being inserted in one of said plurality of first end gripping edge parts, wherein the one of the plurality of first end gripping edge parts and the second end edge define a limit on one of said plurality of tool strips on the X-axis, the second end section being assembled toward the second end edge of said plate, one of the plurality of second end buckle parts and the second end section being aligned with each other on the X-axis;

a slider that limits a movement of the one of said plurality of tool strips on the Z-axis, said slider having a pressing plate part and a pair of compression edge parts and an abutting edge and an inner side, the pressing plate part aligning the second end section of the one of the plurality of tool strips so as to limit a movement of the one of the plurality of tool strips on the Z-axis, wherein the plurality of first end gripping edge parts are embedded in the plurality of trip parts in a slidable manner along the X-axis so as to define a position of said slider along the Z-axis; and an anti-disengaging stopper formed on the plate bottom of the plate adjacent to the second end edge, said anti-disengaging stopper having a release control part and a clamping part, the clamping part and a height of an inner side of the slider on the Z-axis being in an aligned relationship, the release control part being adapted to release the clamping part from abutment, wherein one of the pair of compression edge parts is adapted to be movably positioned beneath and abut an underside of one of said plurality of second end buckle parts, such that said slider is slidable in and out along the X-axis direction, the anti-disengaging stopper being set on a path of the sliding in and out of said slider.

8. The slider limit tool placement plate of claim 7, the abutting edge of said slider abuts the second end edge of said plate.

9. The slider limit tool placement plate of claim 7, wherein one of the plurality of first end gripping edge parts is formed on the first end edge of said plate, the first end section of the one of said plurality of tool strips being insertable in the one of the plurality of first end gripping edge parts so as to be positionable on the Y-axis.

* * * * *